(12) United States Patent
Kaushik

(10) Patent No.: US 8,311,120 B2
(45) Date of Patent: Nov. 13, 2012

(54) CODING MODE SELECTION USING INFORMATION OF OTHER CODING MODES

(75) Inventor: Vinod Kaushik, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1474 days.

(21) Appl. No.: 11/849,059

(22) Filed: Aug. 31, 2007

(65) Prior Publication Data

US 2008/0152000 A1     Jun. 26, 2008

Related U.S. Application Data

(60) Provisional application No. 60/871,660, filed on Dec. 22, 2006.

(51) Int. Cl.
*H04B 1/66* (2006.01)
(52) U.S. Cl. .............................. 375/240.23; 375/240.16
(58) Field of Classification Search .............. 375/240.18
See application file for complete search history.

(56) References Cited

U.S. PATENT DOCUMENTS

| | | | |
|---|---|---|---|
| 2005/0276326 A1 | 12/2005 | Drezner | |
| 2006/0039476 A1* | 2/2006 | Watanabe ................. | 375/240.16 |
| 2007/0086523 A1* | 4/2007 | Yan .......................... | 375/240.13 |
| 2008/0037641 A1* | 2/2008 | Qiu et al. ................. | 375/240.16 |
| 2008/0117972 A1* | 5/2008 | Ramachandran et al. ........................ | 375/240.16 |
| 2008/0123750 A1* | 5/2008 | Bronstein et al. ........ | 375/240.24 |
| 2008/0137752 A1* | 6/2008 | He ........................... | 375/240.24 |
| 2008/0310510 A1* | 12/2008 | Hiwasa et al. ............ | 375/240.16 |
| 2009/0074073 A1* | 3/2009 | Srinivasan et al. ....... | 375/240.16 |
| 2009/0225862 A1* | 9/2009 | Sato et al. ................. | 375/240.16 |
| 2010/0172417 A1* | 7/2010 | Bhaumik et al. ......... | 375/240.16 |
| 2010/0177826 A1* | 7/2010 | Bhaumik et al. ......... | 375/240.16 |

FOREIGN PATENT DOCUMENTS

| | | |
|---|---|---|
| CN | 1717051 A | 1/2006 |
| JP | 2006500796 A | 1/2006 |
| KR | 20040091746 | 10/2004 |
| WO | 03079681 | 9/2003 |
| WO | WO2005120077 A1 | 12/2005 |

OTHER PUBLICATIONS

Hyungjoon Kim et al: "Low-complexity macroblock mode selection for H.264.AVC encoders" Image Processing, 2004. ICIP '04. 2004 International Conference on Singpore Oct. 24-27, 2004, pp. 765-768, XP010785115.

(Continued)

*Primary Examiner* — Matthew Smithers
(74) *Attorney, Agent, or Firm* — Stanton C. Braden

(57) ABSTRACT

This disclosure describes techniques for coding mode selection. In particular, an encoding device determines whether or not to code a block of pixels in a coding mode currently being considered for selection using information associated with at least one other coding mode with a different block partition. In one aspect, the encoding device uses information associated with at lest one coding mode that has block partitions that are sub-partitions of the block partitions of the coding mode currently being considered for selection. Additionally, the encoding device may use information associated with another coding mode that has the same block partitions as the coding mode currently being considered for selection or information associated with the coding mode currently being considered for selection.

60 Claims, 5 Drawing Sheets

OTHER PUBLICATIONS

Changsung Kim et al: "A Feature-based Approach to Fast H.264 Intra/Inter Mode Decision" Circuits and Systems, 2005. ISCAS 2005. IEEE International Symposium O N Kobe, Japan May 23-26, 2005, Piscataway, NJ, USA, IEEE, pp. 308-311, XP010815539.

International Search Report—PCT/US2007/088760, International Search Authority—European Patent Office—Jun. 25, 2008.

Written Opinion—PCT/US2007/088760, International Search Authority—European Patent Office—Jun. 25, 2008.

Translation of Office Action in chinese application 200780046886.1 corresponding to U.S. Appl. No. 11/849,059, citing CN1717051 and WO2005120077A1 dated Feb. 25, 2011.

European Search Report, EP11009106—International Search Authority—Munich—Apr. 4, 2012.

\* cited by examiner

CODING MODE SELECTION USING INFORMATION OF OTHER CODING MODES

This application claims the benefit of priority from U.S. Provisional Application No. 60/871,660, entitled "Method and Apparatus for Skip Mode Detection in Hybrid Video Compression" and filed on Dec. 22, 2006, which is assigned to the assignee hereof and which is fully incorporated herein by reference for all purposes.

TECHNICAL FIELD

The disclosure relates to multimedia encoding and, more particularly, techniques for coding mode selection.

BACKGROUND

Digital video capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video coding standards have been established for coding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video coding standards support improved transmission efficiency of video sequences by coding data in a compressed manner.

Many current techniques make use of block-based coding. In block-based coding, frames of a multimedia sequence are divided into discrete blocks of pixels, and the blocks of pixels are coded based on differences with other blocks, which may be located within the same frame or in a different frame. Some blocks of pixels, often referred to as "macroblocks," comprise a grouping of sub-blocks of pixels. As an example, a 16×16 macroblock may comprise four 8×8 sub-blocks. The sub-blocks may be coded separately. For example, the H.264 standard permits coding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, and 8×2.

SUMMARY

In certain aspects of this disclosure, a method for processing multimedia data comprises obtaining information associated with a first coding mode for a first partition of a block of pixels of a current frame, obtaining information associated with at least one other coding mode for at least one other partition of the block of pixels, wherein the at least one other partition is different than the first partition, and determining whether the block of pixels should be coded in the first coding mode using at least the information associated with the at least one other coding mode.

In certain aspects of this disclosure, an apparatus for processing video data comprises a memory and a control module that obtains, from the memory, information associated with a first coding mode for a first partition of a block of pixels of a current frame and information associated with at least one other coding mode for at least one other partition of the block of pixels, and determines whether the block of pixels should be coded in the first coding mode using at least the information associated with the at least one other coding mode. The at least one other partition is different than the first partition.

In certain aspects of this disclosure, an apparatus for processing video data comprises means for obtaining information associated with a first coding mode for a first partition of a block of pixels of a current frame, means for obtaining information associated with at least one other coding mode for at least one other partition of the block of pixels, wherein the at least one other partition is different than the first partition mode, and means for determining whether the block of pixels should be coded in the first coding mode using at least the information associated with the at least one other coding mode.

In certain aspects of this disclosure, a computer-program product for processing multimedia data comprises a computer readable medium having instructions. The instructions include code for obtaining information associated with a first coding mode for a first partition of a block of pixels of a current frame, code for obtaining information associated with at least one other coding mode for at least one other partition of the block of pixels, wherein the at least one other partition is different than the first partition mode, and code for determining whether the block of pixels should be coded in the first coding mode using at least the information associated with the at least one other coding mode.

In certain aspects of this disclosure, a wireless communication device handset for processing video data comprises an encoding module that obtains information associated with a first coding mode for a first partition of a block of pixels of a current frame and information associated with at least one other coding mode for at least one other partition of the block of pixels, determines whether the block of pixels should be coded in the first coding mode using at least the information associated with the at least one other coding mode and codes the block of pixels in the first coding mode, wherein the at least one other partition is different than the first partition, and a transmitter for transmitting the coded block of pixels.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. The software that executes the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other features, objects, and advantages will be apparent from the description and drawings, and from the claims.

DETAILED DESCRIPTION

Figure 1:
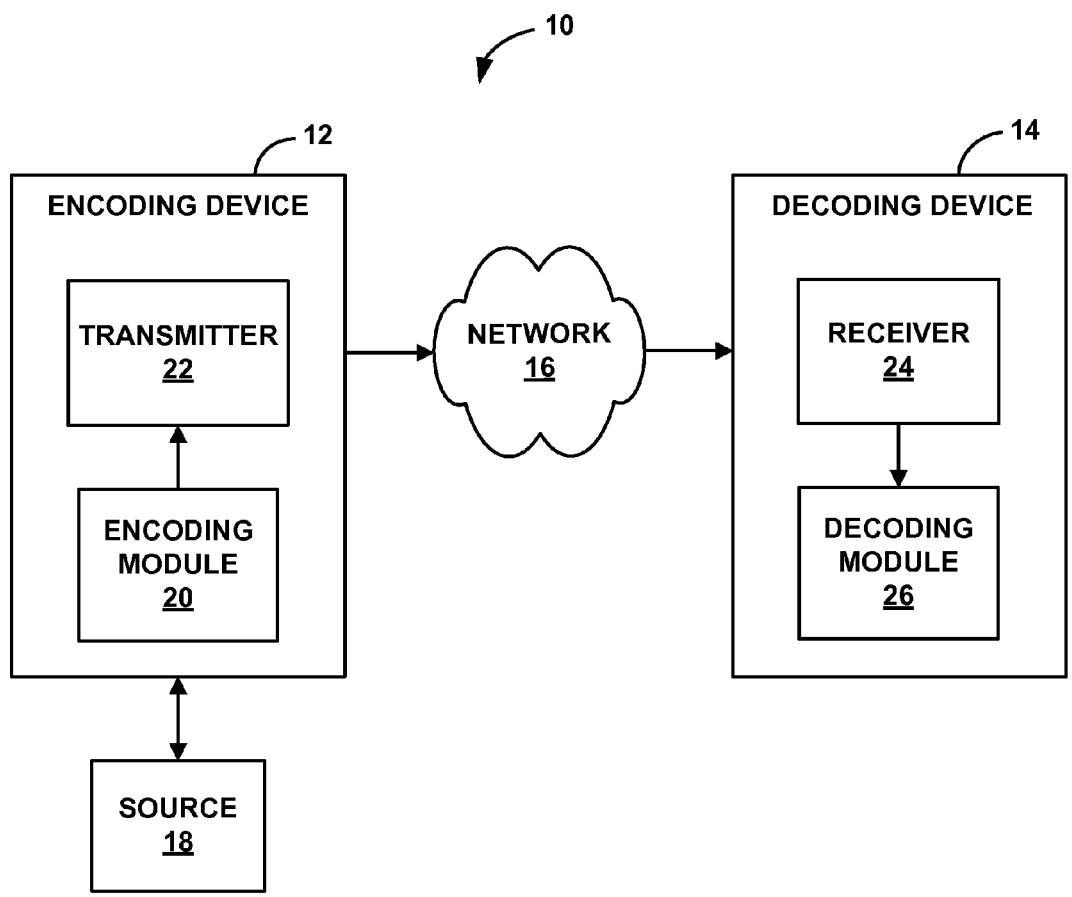
FIG. 1 is a block diagram illustrating a multimedia coding system that employs coding mode selection in accordance with the techniques described herein.

To provide high compression efficiency, an encoding device may support a plurality of coding modes. Each of the coding modes may correspond to different coding techniques and/or partitions of a block of pixels. In the case of the International Telecommunication Union (ITU)-T H.264 standard, for example, there are a plurality of inter-coding modes and intra-coding modes. The inter-coding modes include a SKIP mode, DIRECT mode, 16×16 mode, 16×8 mode, 8×16 mode, 8×8 mode, 8×4 mode, 4×8 mode, and 4×4 mode. The inter-coding modes use inter-coding techniques that code the blocks of pixels with reference to at least a portion of one or more other previous and/or subsequent, temporally located frames. Moreover, the inter-coding techniques may correspond to variable sized partitions of the block of pixels. The SKIP mode corresponds to a 16×16 partition, but the encoding device does not code any motion or residual information in the SKIP mode. The DIRECT mode corresponds to a either a 16×16 partition or an 8×8 partition.

The intra-coding modes include an INTRA 4×4 mode for which there are nine possible interpolation directions and an INTRA 16×16 mode for which there are four possible interpolation directions. The intra-coding modes use intra-coding techniques that code the blocks of pixels without reference to any other temporally located frame. Like the inter-coding modes, the intra-coding modes correspond to variable sized partitions of the block of pixels.

The encoding device analyzes, for each block of pixels, at least a portion of the available coding modes and selects one of the coding modes that codes the blocks of pixels with the highest compression efficiency. In accordance with the techniques of this disclosure, the encoding device analyzes one or more of the coding modes using information associated with at least one other coding mode with a different block partition. In other words, the encoding device may determine whether or not to code the block of pixels using the coding mode currently being considered for selection using information associated with at least one other coding mode that has a block partition different than the block partition of the coding mode currently being considered for selection. The encoding device may additionally use information associated with the coding mode currently being considered for selection in addition to the information associated with the at least one other coding mode. The information associated with a particular coding mode may be the information that would be produced if the block were coded using that particular coding mode. For example, the information associated with the particular coding mode may include motion information, reference information, residual information and/or other information that would be produced if the block were coded using the particular coding mode.

Such techniques may be used, for example, to select one of the coding modes for the block of pixels. Alternatively, the techniques may be used to reduce the number of potential coding modes from which the encoding device may select. For example, the techniques may be used to eliminate at least a portion of the coding modes that may be used for coding the block of pixels. The encoding device may then use other mode selection techniques, such as, comparing rate-distortion (R-D) coding costs for the remaining potential coding modes. In either case, the coding mode selection techniques of this disclosure may reduce the amount of computationally intensive calculations needed to perform effective mode selection and/or result in more accurate mode selections.

FIG. 1 is a block diagram illustrating a multimedia coding system 10 that employs a coding mode selection technique in accordance with the techniques described herein. Multimedia coding system 10 includes an encoding device 12 and a decoding device 14 connected by a network 16. Encoding device 12 obtains digital multimedia sequences from at least one source 18, encodes the digital multimedia sequences and transmits the coded sequences over network 16 to decoding device 14.

In certain aspects, source 18 may comprise one or more video content providers that broadcast digital multimedia sequences, e.g., via satellite. In other aspects, source 18 may comprise an image capture device that captures the digital multimedia sequence. In this case, the image capture device may be integrated within encoding device 12 or coupled to encoding device 12. Source 18 may also be a memory or archive within encoding device 12 or coupled to encoding device 12.

The multimedia sequences received from source 18 may comprise live real-time or near real-time video and/or audio sequences to be coded and transmitted as a broadcast or on-demand, or may comprise pre-recorded and stored video and/or audio sequences to be coded and transmitted as a broadcast or on-demand. In some aspects, at least a portion of the multimedia sequences may be computer-generated, such as in the case of gaming.

The digital multimedia sequences received from source 18 may be described in terms of a sequence of pictures, which include frames (an entire picture) or fields (e.g., fields of alternating odd or even lines of a picture). Further, each frame or field may further include two or more slices, or sub-portions of the frame or field. As used herein, the term "frame" may refer to a picture, a frame, a field or a slice thereof.

Encoding device 12 encodes the multimedia sequences for transmission to decoding device 14. Encoding device 12 may encode the multimedia sequences according to a video compression standard, such as Moving Picture Experts Group (MPEG)-1, MPEG-2, MPEG-4, ITU-T H.263, or ITU-T H.264, which corresponds to MPEG-4, Part 10, Advanced Video Coding (AVC). Such encoding, and by extension, decoding, methods may be directed to lossless or lossy compression algorithms to compress the content of the frames for transmission and/or storage. Compression can be broadly thought of as the process of removing redundancy from the multimedia data.

In some aspects, this disclosure contemplates application to Enhanced H.264 video coding for delivering real-time multimedia services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099, August 2006 (the "FLO Specification"). However, the coding mode selection techniques described in this disclosure are not limited to any particular type of broadcast, multicast, unicast or point-to-point system.

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced video coding for generic audiovisual services, by the ITU-T Study Group, and dated 03/2005, which may be referred to herein as the H.264 standard or H.264 specification, or the H.264/AVC standard or specification.

The JVT continues to work on a scalable video coding (SVC) extension to H.264/MPEG-4 AVC. The specification of the evolving SVC extension is in the form of a Joint Draft (JD). The Joint Scalable Video Model (JSVM) created by the JVT implements tools for use in scalable video, which may be used within multimedia coding system 10 for various coding tasks described in this disclosure. Detailed information concerning Fine Granularity SNR Scalability (FGS) coding can be found in the Joint Draft documents, e.g., in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

As illustrated in FIG. 1, encoding device 12 includes an encoding module 20 and a transmitter 22. Encoding module 20 encodes each of the frames of the sequences received from source 18 using one or more coding techniques. For example, encoding module 20 may encode one or more of the frames using intra-coding techniques. Frames encoded using intra-coding techniques, often referred to as intra ("I") frames, are coded without reference to other frames. Frames encoded using intra-coding, however, may use spatial prediction to take advantage of redundancy in other multimedia data located in the same frame.

Encoding module 20 may also encode one or more of the frames using inter-coding techniques. Frames encoded using inter-coding techniques are coded with reference to at least a portion of one or more other frames, referred to herein as reference frames. The inter-coded frames may include one or more predictive ("P") frames, bi-directional ("B") frames or a combination thereof. P frames are encoded with reference to at least one temporally prior frame while B frames are encoded with reference to at least one temporally future frame and at least one temporally prior frame. The temporally prior and/or temporally future frames are referred to as reference frames. In this manner, inter-coding takes advantage of redundancy in multimedia data across temporal frames.

Encoding module 20 may be further configured to encode a frame of the sequence by partitioning the frame into a plurality of subsets of pixels, and separately encode each of the subsets of pixels. These subsets of pixels may be referred to as blocks or macroblocks. Encoding module 20 may further sub-partition each block into two or more sub-blocks. As an example, a 16×16 block may comprise four 8×8 sub-blocks, or other sub-partition blocks. For example, the H.264 standard permits encoding of blocks with a variety of different sizes, e.g., 16×16, 16×8, 8×16, 8×8, 8×4, 4×8 and 4×4. Further, by extension, sub-partitions of the blocks may be made into sub-blocks of any size, e.g., 2×16, 16×2, 2×2, 4×16, 8×2 and so on. Blocks of larger or smaller than sixteen rows or columns are also possible. As used herein, the term "block" may refer to either any size block or a sub-block.

Encoding module 20 may support a plurality of coding modes. As described above, each of the coding modes may be correspond to a different coding techniques and/or partitions of the blocks of pixels. In the case of the H.264 standard, for example, encoding module 20 supports a number of inter modes (e.g., SKIP mode, DIRECT mode, 16×16 mode, 16×8 mode, 8×16 mode, 8×8 mode, 8×4 mode, 4×8 mode, and 4×4 mode) and a number of intra modes (i.e., INTRA 4×4 modes and INTRA 16×16 modes). Encoding module 20 analyzes, for each block of pixels, at least a portion of the available coding modes and selects the coding mode that codes the blocks of pixels with the highest compression efficiency.

When determining whether or not to code the block of pixels in the coding mode currently being considered for selection, encoding module 20 may use information associated with at least one other coding mode that has a different block partition than the block partition of the coding mode currently being considered for selection. Encoding module 20 may also use information associated with the coding mode currently being considered for selection as well as information associated with a coding mode with the same block partition in addition to the information associated with the other coding mode to make the determination. In one aspect, encoding module 20 uses information associated with a coding mode that has block partitions that are sub-partitions of the block partition or partitions of the block of pixels of the coding mode currently being considered for selection. In other words, the coding mode currently being considered for selection has a first block partition. The other coding mode whose information is used to make a determination of whether to code the block of pixels in the coding mode currently being considered for selection has a second block partition. The second block partition includes sub-partitions of the first block partition. For example, encoding module 20 may use information associated with the inter 8×8 coding mode to make a determination regarding the inter 16×16 coding mode or use the inter 4×8 coding mode to make a determination regarding the inter 8×8 coding mode.

As described above, the information associated with a particular coding mode may be the information that would be produced if the block were coded using that particular coding mode. For example, the information associated with the particular coding mode may include motion information, reference information, residual information and/or other information that would be produced if the block were coded using the particular coding mode.

Such techniques may be used to select one of the coding modes. The techniques of this disclosure may, for example, be particularly useful for performing SKIP mode detection. The techniques, however, may also be useful in selecting other coding modes, such as DIRECT modes, Inter square modes (e.g., 16×16, 8×8, or 4×4), Inter rectangular modes (e.g., 16×8, 8×16, 8×4, or 4×8) and for fast mode decisions in general. Alternatively, the techniques may be used to reduce the number of potential coding modes from which the encoding device may select. For example, the techniques may be used to eliminate at least a portion of the coding modes that may be used for coding the block of pixels. In either case, the mode selection techniques may result in more accurate mode selections by analyzing not only information associated with the mode currently being considered for selection but also information associated with another coding mode. Additionally, the mode selection techniques of this disclosure may reduce the amount of computationally intensive calculations needed to perform effective mode selection. In some cases, for example, control module 32 may not need to compute information associated with the coding mode currently being analyzed, thus reducing the number of computationally intensive calculations needed to select a coding mode. In other cases, the techniques may reduce the number of expensive calculations by performing mode selection using information that does not need to be transformed, quantized and entropy coded.

Encoding device 12 applies the selected coding mode to code the blocks of the frames and transmits the coded frames over network 16 via transmitter 22. Transmitter 22 may include appropriate modem and driver circuitry software and/or firmware to transmit encoded multimedia over network 16. In certain aspects, encoding device 12 may encode, combine and transmit frames received over a period of time. In some multimedia coding systems, for example, a plurality of frames of multimedia data are grouped together into a segment of multimedia data, sometimes referred to as a "superframe." As used herein, the term "superframe" refers to a group of frames collected over a time period or window to form a segment of data. In a coding system that utilizes FLO technology, the superframe may comprise a one-second segment of data, which may nominally have 30 frames. A superframe may, however, include any number of frames. The techniques may also be utilized for encoding, combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals. Note that, throughout this disclosure, a particular segment of multimedia data (e.g., similar to the concept of a superframe) refers to any chunk of multimedia data of a particular size and/or duration.

In some aspects, encoding device 12 may form part of a broadcast network component used to broadcast one or more channels of multimedia data. As such, each of the encoded sequences may correspond to a channel of multimedia data. Each of the channels of multimedia data may comprise a base layer and, possibly, one or more enhancement layer. As an example, encoding device 12 may form part of a wireless base station, server, or any infrastructure node that is used to broadcast one or more channels of encoded multimedia data to wireless devices. In this case, encoding device 12 may transmit the encoded data to a plurality of wireless devices, such as decoding device 14. A single decoding device 14, however, is illustrated in FIG. 1 for simplicity. In other aspects, encoding device 12 may comprise a handset that transmits locally captured video for video telephony or other similar applications. For example, encoding device 12 may be implemented as part of a digital television, a wireless communication device, a gaming device, a portable digital assistant (PDA), a laptop computer or desktop computer, a digital music and video player device, or a radiotelephone such as cellular, satellite or terrestrial-based radiotelephone, or other wireless mobile terminal equipped for video and/or audio streaming, video telephony, or both. In other words, the encoding device 12 may be implemented as part of a wireless communication device handset. In other aspects, encoding device 12 may comprise a wired device coupled to a wired network.

Encoding device 12 transmits the encoded sequences over network 16 to decoding device 14 for decoding and, possibly, presentation to a user of decoding device 14. Network 16 may comprise one or more of a wired or wireless communication networks, including one or more of an Ethernet, plain old telephone service (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as General packet Radio Service (GPRS/GSM)/enhanced data GSM environment (EDGE), a Terrestrial Trunked Radio (TETRA) mobile telephone system, a wideband code division multiple access (WCDMA) system, a high data rate (1xEV-DO or 1xEV-DO Gold Multicast) system, an IEEE 802.11 system, a FLO system, a digital media broadcast (DMB) system, a digital video broadcast-handheld (DVB-H) system, integrated services digital broadcast-terrestrial (ISDB-T) system and the like. Although described in the wireless context, the techniques of this disclosure may be used to compress data for transmission via a wired network.

Decoding device 14 includes a receiver 24 and a decoding module 26. Decoding device 14 receives the encoded data from encoding device 12 via receiver 24. Like transmitter 22, receiver 24 may include appropriate modem and driver circuitry software and/or firmware to receive encoded multimedia over network 16, and may include RF circuitry to receive wireless data carrying the encoded multimedia data in wireless applications. Decoding module 26 decodes the coded frames of data received via receiver 24. Decoding device 14 may further present the decoded frame of data to a user via a display (not shown) that may be either integrated within decoding device 14 or provided as a discrete device coupled to decoding device 14 via a wired or wireless connection.

Decoding device 14 may, for example, be implemented as part of a digital television, a wireless communication device, a gaming device, a portable digital assistant (PDA), a laptop computer or desktop computer, a digital music and video player device, a radiotelephone such as cellular, satellite or terrestrial-based radiotelephone, or other wireless mobile terminal equipped for video and/or audio streaming, video telephony, or both. Decoding device 14 may be associated with a mobile or stationary device. In other aspects, decoding device 14 may comprise a wired device coupled to a wired network.

In some examples, encoding device 12 and decoding device 14 each may include reciprocal transmit and receive circuitry so that each may serve as both a transmit device and a receive device for encoded multimedia and other information transmitted over network 16. In this case, both encoding device 12 and decoding device 14 may transmit and receive multimedia sequences and thus participate in two-way communications. In other words, the illustrated components of multimedia coding system 10 may be integrated as part of an encoder/decoder (CODEC).

The components in encoding device 12 and decoding device 14 are exemplary of those applicable to implement the techniques described herein. Encoding device 12 and decoding device 14, however, may include many other components, if desired. For example, encoding device 12 may include a plurality of encoding modules that each receive one or more sequences of multimedia data and encode the respective sequences of multimedia data in accordance with the techniques described herein. In this case, encoding device 12 may further include at least one multiplexer to combine the segments of data for transmission. In addition, encoding device 12 and decoding device 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

Figure 2:
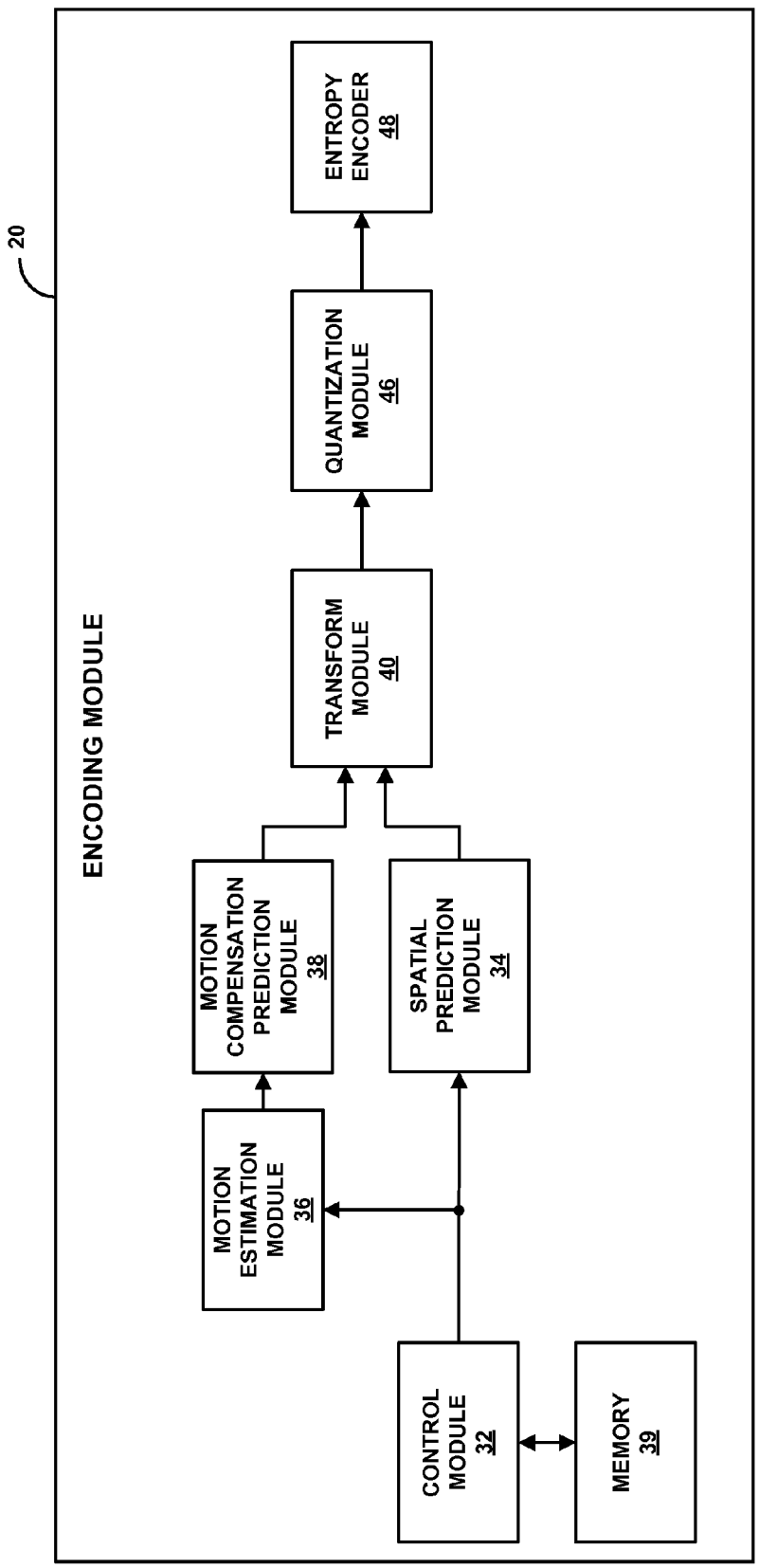
FIG. 2 is a block diagram illustrating an encoding module associated with the coding system of FIG. 1.

FIG. 2 is a block diagram illustrating encoding module 20 of FIG. 1 in further detail. In some aspects, encoding module 20 may form part of a wireless communication device handset or broadcast server. Encoding module 20 includes a control module 32 that receives input frames of multimedia data of one or more multimedia sequences from at least one source 18 (FIG. 1), and processes the frames of the received multimedia sequences. In particular, control module 32 analyzes the incoming frames of the multimedia sequences and determines whether to encode or skip the incoming frames based on analysis of the frames. Encoding device 12 may, for example, skip frames in the multimedia sequence to encode the information at a reduced frame rate thereby conserving bandwidth across network 16.

Moreover, for the incoming frames that will be encoded, control module 32 may also be configured to determine whether to encode the frames as I frames, P frames or B frames. Control module 32 may determine to encode an incoming frame as an I frame at the start of a multimedia sequence, at a detected scene change within the sequence, for use as a channel switch frame (CSF) or for use as an intra refresh frame. Otherwise, control module 32 encodes the frame as an inter-coded frame (i.e., a P frame or B frame) to reduce the amount of bandwidth associated with coding the frame.

Control module 32 may be further configured to partition the frames into a plurality of blocks and select a coding mode, such as one of the H.264 coding modes described above, for each of the blocks. To aid in selecting a coding mode for each of the blocks, encoding module 20 generates information associated with at least a portion of the coding modes. In coding modes for which the blocks are divided into sub-blocks or sub-partitions, encoding module 20 generates information associated with each of the sub-blocks or sub-partitions. For a block selected to be inter-coded, a motion estimation module 36 performs motion estimation to select a reference frame and compute motion information for each partition or sub-partition of the block. To select a reference frame, motion estimation module 36 searches one or more temporally prior and/or temporally future frames for a block that is a best match to the block to be coded in the input frame. Motion estimation module 36 may compare the block to be coded with the blocks in the one or more temporally prior and/or temporally future frames using an error measure, e.g., sum of absolute difference (SAD), mean square error (MSE) or the like. Motion estimation module 36 may select the block with the smallest error measurement. The frame associated with the selected block is the reference frame. Motion estimation module 36 may compare the block to be coded with blocks of a predetermined search area of the reference frame or frames. Alternatively, motion estimation module 36 may perform a full search of all the blocks in the reference frame or frames.

Once the reference frame and the corresponding block are identified, motion estimation module 36 computes motion information that represents the displacement of the identified block in the reference frame with respect to the block in the current frame, i.e., the block to be coded. Thus, the motion information, often referred to as a motion vector, represents an offset between the location of the block in the input frame and the location of the identified block in the reference frame.

Motion compensation prediction module 38 computes a difference between the block of the input frame and the identified block in the reference frame to which the motion vector points. This difference is the residual information for the block. Motion compensation prediction module 38 may compute residual information for both the luma and the chroma components of the block. In one aspect, motion compensation prediction module 38 may compute a coded block pattern (CBP) cost for coding the luma and the chroma components.

For a block selected to be intra-coded, spatial prediction module 34 generates the residual information for the block. Spatial prediction module 34 may, for example, generate a predicted version of the block via interpolation using one or more adjacent blocks and the interpolation directionality corresponding to the selected intra-coding mode. Spatial prediction module 34 may then compute a difference between the block of the input frame and the predicted block. This difference is referred to as residual information or residual coefficients. As with the inter-coding modes, spatial prediction module 34 may compute a CBP cost for coding the residual information.

Motion estimation module 36, motion compensation prediction module 38 and spatial prediction module 34 may store the information computed for the different coding modes in memory 39. Memory 39 may comprise, for example, random access memory (RAM), read-only memory (ROM), non-volatile random access memory (NVRAM), electrically erasable programmable read-only memory (EEPROM), FLASH memory, or the like. As will be described in detail below, control module 32 may use the information stored in memory 39 to perform coding mode selection.

In particular, control module 32 determines whether or not to code the block of pixels in the coding mode currently being considered for selection using information associated with at least one of the other coding modes that has a different block partition than the coding mode currently being considered for selection. In one aspect, control module 32 uses information associated with a coding mode that has block partitions that are sub-partitions of the block partitions of the coding mode currently being considered for selection. Control module 32 may additionally use information associated with coding mode currently being considered for selection as well as information associated with another coding mode that has the same block partitions as the coding mode currently being considered for selection.

As one example, control module 32 may use information associated with the inter 8×8 coding mode to determine whether or not to code the block of pixels in the inter 16×16 coding mode. More specifically, information associated with the inter 16×16 coding mode and the inter 8×8 coding mode may be computed by motion estimation module 36 and motion compensation prediction module 38. For example, motion estimation module 36 and motion compensation prediction module 38 may compute information that would be produced if the block were coded using that particular coding mode. This information may include one or more motion vectors, reference frame indices, residual information, or the like. As described above, the information associated with the inter 8×8 coding mode, the 16×16 coding mode or both may be computed at an earlier time and stored within memory 39. Alternatively, the information associated with one or both of the inter 16×16 and inter 8×8 coding modes may be computed as needed, e.g., during the analysis of the inter 16×16 coding mode.

Control module 32 may, for example, analyze motion information, reference information, residual information and/or other information of the at least one other coding mode to determine whether or not to code the block of pixels in the coding mode currently being considered for selection. Control module 32 may compare at least a portion of the information associated with the inter 16×16 coding mode with the respective portion of the information associated with the inter 8×8 coding mode to make determine whether or not to code the block of pixels using the inter 16×16 coding mode. In one aspect, control module 32 may compare a magnitude of the motion vector computed for the inter 16×16 coding mode with a magnitude of a mean of the four motion vectors computed for the inter 8×8 coding mode. When the magnitudes of the 16×16 motion vector and the mean of the four 8×8 motion vectors are not substantially the same, e.g., a difference between the magnitudes is greater than or equal to a threshold, control module 32 may determine that the inter 16×16 coding mode will not result in the highest compression efficiency. In other words, control module 32 determines not to code the block of pixels using the inter 16×16 coding mode when the magnitudes of the 16×16 motion vector and the mean of the four 8×8 motion vectors are not substantially the same. Control module 32 may also compare directions of the motion vectors of the inter 8×8 and inter 16×16 coding modes, as will be described in more detail below.

Additionally, control module 32 may analyze other information associated with the inter 8×8 coding mode to determine whether or not to code the block using the inter 16×16 coding mode. Control module 32 may, for example, determine whether reference information for each of the 8×8 sub-blocks references a frame that is temporally located immediately adjacent to the current frame. When the reference information associated with any of the sub-blocks of the inter 8×8 coding mode references a frame that is not temporally located immediately adjacent to the current frame, control module 32 may determine that the inter 16×16 coding mode will not result in the highest compression efficiency. In this case, control module does not select the 16×16 coding mode for use in coding the particular block under consideration.

Using information associated with one or more other coding modes to determine whether or not to code the block using the coding mode currently being considered for selection allows control module 32 to more accurately select a coding mode. Rather than selecting a coding mode using only information associated with the coding mode currently being considered for selection, selection of the mode may be based at least on part on information associated with other modes that is indicative of the likely performance of the mode under consideration. Additionally, control module 32 may make the selection using a reduced amount of computationally intensive calculations. In some cases, for example, control module 32 may not need to compute information associated with the coding mode currently being analyzed, thus reducing the number of computationally intensive calculations needed to select a coding mode. In this manner, by relying on information for other modes, the mode under consideration can be analyzed for selection without at least some of the extensive computations that would otherwise have been necessary.

Although in the example described above control module 32 uses information associated with one other coding mode with a different block partition in determining whether to code the block in coding mode currently being considered for selection, control module 32 may use information associated with more than one other coding mode with different block partitions. For example, control module 32 may use information associated with the inter 4×4 coding mode or other inter coding modes in addition to the information associated with the 8×8 coding mode to determine whether or not to code the block using the inter 16×16 coding mode. Coding modes with different block partitions may be more likely to produce information that is relevant to selection of the mode currently under consideration.

As described above, the techniques of this disclosure may be particularly useful in more accurately performing SKIP mode detection. For example, control module 32 may use information associated with another coding mode with a different block partition than the block partition of the SKIP coding mode when determining whether to apply the SKIP mode. In the SKIP mode, the partition block size is 16×16, which is the same partition block size as the inter 16×16 coding mode. In some aspects, control module 32 may more accurately determine whether to code the block in the SKIP mode using information associated with the SKIP mode, the inter 16×16 coding mode and the inter 8×8 coding mode. In other words, in this SKIP mode detection example control module 32 uses information associated with one other coding mode that has the same block partition as the SKIP mode (i.e., the inter 16×16 coding mode) and information associated with one other coding mode that has a different block partition (i.e., the inter 8×8 coding mode).

Control module 32 may use information associated with the other coding mode that has the same block partition as the SKIP mode, i.e., the inter 16×16 coding mode, to make an initial determination regarding the SKIP mode. Control module 32 may then determine the accuracy of the initial determination using the other coding mode that has the different block partition, i.e., the 8×8 coding information. To make the initial determination regarding the SKIP mode, control module 32 analyzes information associated with the SKIP mode along with information associated with the inter 16×16 coding mode. Control module 32 may compare the motion vector of the SKIP mode with the motion vector of the inter 16×16 coding mode to determine whether the SKIP motion vector and the 16×16 motion vector are substantially the same. Control module 32 may compare the magnitude and/or direction of the motion vectors. Control module 32 may also analyze reference frame information (e.g., a reference frame index) associated with the inter 16×16 coding mode as well as residual information associated with the inter 16×16 coding mode in performing skip mode detection. For example, control module 32 may initially determine that the SKIP mode is the most efficient mode when (a) the motion vectors of the SKIP mode and the inter 16×16 coding mode are substantially the same, (b) the reference frame of the inter 16×16 coding mode is temporally located immediately adjacent to the current frame and (c) there is no residual data to code in the inter 16×16 coding mode.

Control module 32 then uses the information associated with the inter 8×8 coding mode to more accuracy determine whether to code the block using the SKIP mode. Control module 32 may, for example, analyze the information associated with the inter 8×8 coding mode in the same manner as described above with respect to the inter 16×16 coding mode decision example. In particular, control module 32 may compare a magnitude of the motion vector associated with the SKIP mode with a magnitude of a mean of the four motion vectors associated with the inter 8×8 coding mode. Control module 32 may additionally determine whether the motion vectors of each of the 8×8 sub-blocks are aligned in substantially the same direction as the motion vector of the SKIP mode. Control module 32 may also determine whether the reference information for each of the 8×8 sub-blocks references a frame that is temporally located immediately adjacent to the current frame. Control module 32 may determine that the block should be coded in the SKIP coding mode when (a) the motion vectors are of a substantially similar magnitude, (b) the motion vectors of each of the 8×8 sub-blocks are aligned in the same direction as the SKIP mode motion vector, and (c) the reference information for each of the 8×8 sub-blocks references the frame that is temporally located immediately adjacent to the current frame, control module 32 may determine that the initial SKIP coding mode determination is an accurate determination. In other words, the SKIP coding mode will result in the highest compression efficiency. On this basis, control module 32 may select the SKIP mode to code the block under consideration. Otherwise, control module 32 determines that the SKIP coding mode will not result in the highest compression efficiency and analyzes one or more other coding modes. Different modes may be selected for different blocks as control module 32 selects coding modes for various blocks in a frame or slice.

As described above, control module 32 may select the block mode for the current block using the techniques described above. Alternatively, the techniques of this disclosure may be used to reduce the number of potential coding modes. For example, the techniques described above may be used to determine that SKIP mode and inter 16×16 are not the most efficient coding modes. Control module 32 may then use other mode selection techniques to select the mode for the current block from the reduced set of coding modes. Control module 32 may, for example, compute or estimate the coding cost for the reduced subset of coding modes and select the coding mode with the lowest coding cost. Encoding module 20 may compute or estimate the coding cost as a function of rate and distortion, e.g., in accordance with the equation:

$$J=D+\lambda_{mode}\cdot R, \quad (1)$$

where J is the estimated coding cost, D is a distortion metric of the block, $\lambda_{mode}$ is a Lagrange multiplier of the respective mode, and R is a rate metric of the block. The distortion metric (D) may, for example, comprise a sum of absolute difference (SAD), sum of square difference (SSD), a sum of absolute transform difference (SATD), sum of square transform different (SSTD) or the like. The rate metric (R) may, for example, be a number of coding bits associated with coding the data in a given block. The rate metric R specifies the number of bits that can be allocated to code the data. To compute D and R, encoding module 20 performs motion estimation for each mode being analyzed, computes the residual information, transforms and quantizes the residual information for that particular mode, and codes the residual information as well as any other information (e.g., motion vectors) to compute the rate R. Moreover, encoding module 20 may dequantize and inverse transform the data, and compare the original block with the decoded block to obtain the distortion metric D.

After selecting the coding mode, encoding module 20 encodes the block of data using the selected coding mode. As illustrated in FIG. 2, encoding module 20 includes a transform module 40, a quantization module 46 and an entropy encoder 48. Transform module 40 transforms the at least a portion of the information of the block in accordance with a transform function. For example, transform module 40 may apply an integer transform, such as a 4×4 or 8×8 integer transform or a Discrete Cosine Transform (DCT), to the residual information to generate transform coefficients for the residual information. Quantization module 46 quantizes the information and provides the quantized data to entropy encoder 48. Entropy encoder 48 encodes the quantized data using a context-adaptive coding technique, a fixed length coding (FLC) technique, a universal variable length coding (VLC) technique or other coding technique.

The foregoing techniques may be implemented individually, or two or more of such techniques, or all of such techniques, may be implemented together in encoding module 20. The components in encoding module 20 are exemplary of those applicable to implement the techniques described herein. Encoding module 20, however, may include many other components, if desired, as well as fewer components that combine the functionality of one or more of the modules described above. The components in encoding module 20 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding module 20 and does not necessarily imply that such modules must be realized by separate hardware or software components. Rather, functionality associated with one or more modules may be integrated within common or separate hardware or software components.

Figure 3:
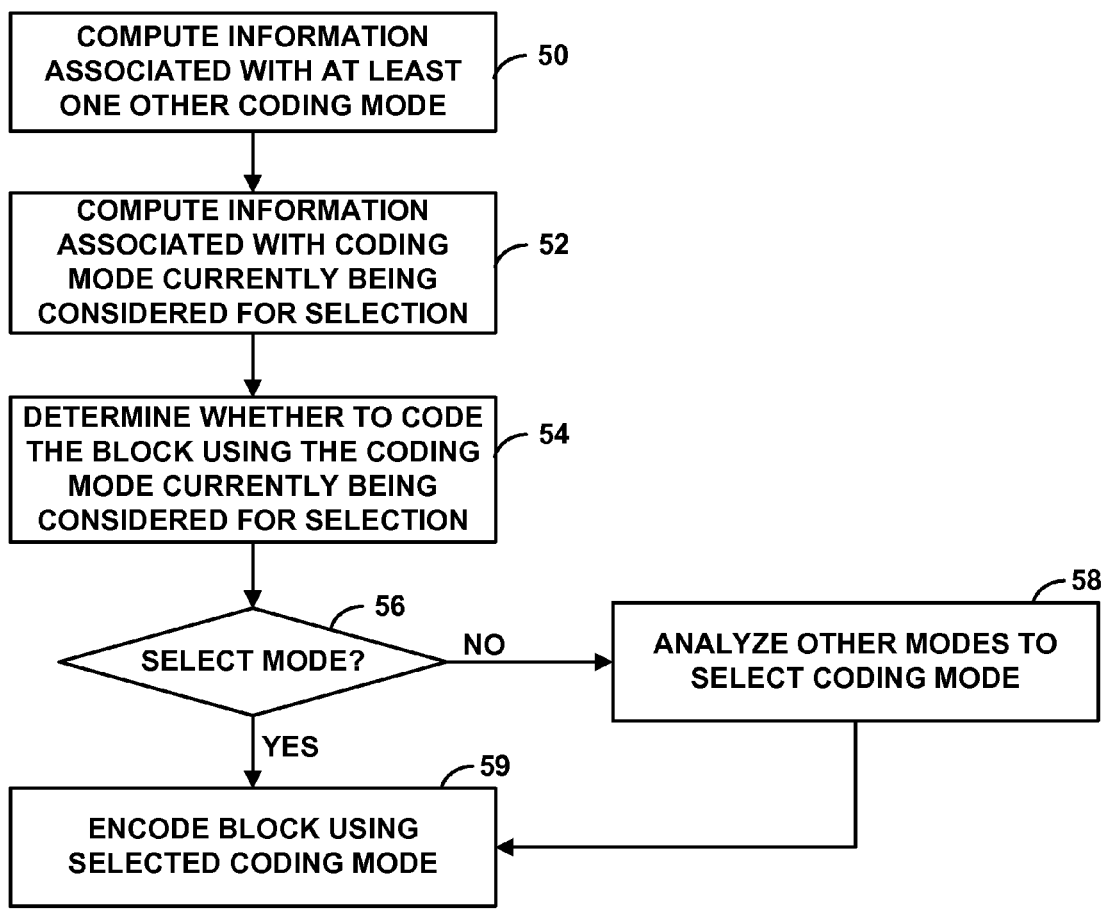
FIG. 3 is a flow diagram illustrating exemplary operation of an encoding module analyzing a coding mode for a block of pixels in accordance with the techniques of this disclosure.

FIG. 3 is a flow diagram illustrating exemplary operation of an encoding module, such as encoding module 20 of FIGS. 1 and 2, analyzing a coding mode for a block of pixels in accordance with the techniques of this disclosure. Encoding module 20 computes information associated with at least one coding mode other than the coding mode currently being considered for selection (50). In some aspects, encoding module 20 may also compute information associated with the coding mode currently being considered for selection (52). In some cases, however, encoding module 20 may not compute the information associated with the coding mode currently being considered for selection. Motion estimation module 36 may generate reference information that identifies one or more reference frames and motion information that represents the displacement of the block being analyzed with respect to an identified block in the reference frame or frames. Additionally, motion compensation prediction module 38 may generate residual information that represents differences between the luma of the blocks and/or the chroma components of the blocks. In some cases, the information associated with each of the coding modes may be stored in memory 39.

Control module 32 makes a determination about the coding mode currently being considered for selection using at least the information associated with the at least one other coding mode the has a different block partition the coding mode currently being considered for selection (54). Control module 32 may, for example, analyze motion information, reference information, residual information and/or other information associated with the at least one other coding mode to make a determination regarding the coding mode currently being analyzed. As described in detail above, the information associated with the at least one other coding mode may be information that would be produced if the block was coded in the at least one other coding mode. As one example, control module 32 may use information associated with the inter 8×8 coding mode to determine whether or not to code the block of pixels in the inter 16×16 coding mode. For example, control module 32 may compare a directionality of the motion vectors of the inter 8×8 to determine whether they are substantially aligned. If the motion vectors are not substantially aligned, control module determine to not select the inter 16×16 coding mode for use in coding the particular block under consideration. As another example, control module 32 may determine whether reference information for each of the 8×8 sub-blocks references a frame that is temporally located immediately adjacent to the current frame. When the reference information associated with any of the sub-blocks of the inter 8×8 coding mode references a frame that is not temporally located immediately adjacent to the current frame, control module 32 may determine to not select the 16×16 coding mode for use in coding the particular block under consideration. Thus, control module 32 may make the determination without computing information associated with the coding mode currently being considered for selection.

Control module 32 may, however, use information associated with more than one other coding mode. For example, control module 32 may use information associated with the inter 4×4 coding mode or other inter coding modes in addition to the information associated with the 8×8 coding mode to analyze the 16×16 inter coding mode. In some cases, it may be advantageous if the other coding modes are coding modes that have block partitions that are sub-partitions of the block partition(s) of the coding mode currently being considered for selection.

Moreover, control module 32 may also use the information associated with the coding mode currently being considered for selection in addition to the information associated with the at least one other coding mode. For example, control module 32 may compare motion information, such as a magnitude and/or direction, of the coding mode currently being considered for selection and the at least one other coding mode to make the determination.

Control module 32 determines whether the coding mode currently being analyzed is selected (56). In some cases, control module 32 may not select a coding mode, but instead use the techniques described above to reduce the number of potential coding modes for which rate-distortion coding costs are computed. When the coding mode currently being analyzed is not selected, encoding module 20 analyzes and selects one of the other coding modes. Encoding module 20 may analyze the other coding modes using the techniques of this disclosure as well as more traditional techniques, such as computing coding costs associated with the other coding modes (58).

After selecting the coding mode, encoding module 20 encodes the block of data using the selected coding mode (59). Using information associated with one or more other coding modes to make a determination regarding the current coding mode being analyzed allows control module 32 to more accurately select a coding mode. Moreover, control module 32 may make the mode selection using a reduced number of computationally intensive calculations. In other words, control module 32 may make the determination with a reduced number of transformation, quantization, entropy coding or other computationally intensive calculations needed to compute or estimate coding costs associated with each of the modes.

Figure 4:
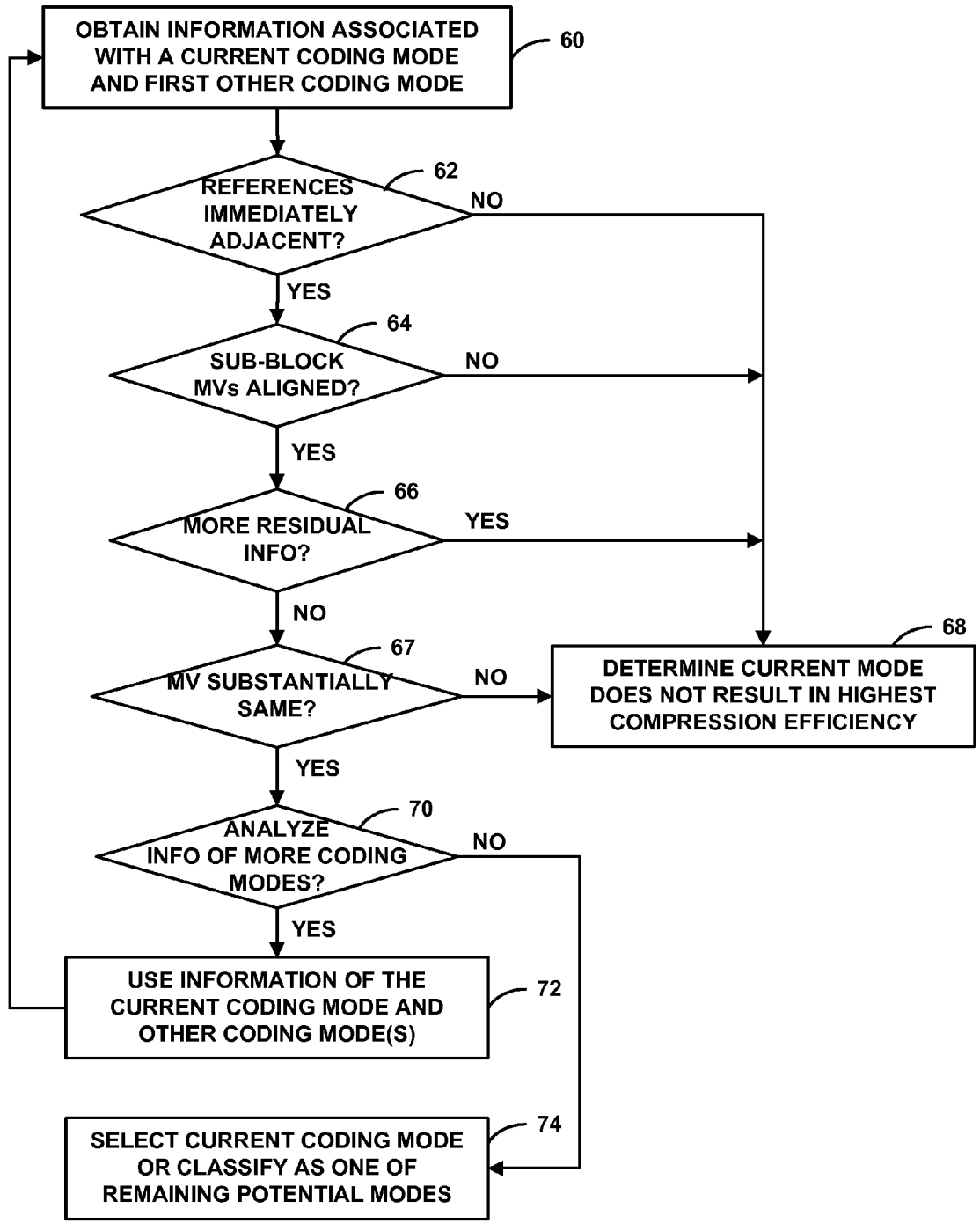
FIG. 4 is a flow diagram illustrating exemplary operation of an encoding module making a determination about a coding mode using information associated with at least one other coding mode.

FIG. 4 is a flow diagram illustrating exemplary operation of an encoding module, such as encoding module 20 of FIGS. 1 and 2, making a determination about a coding mode using information associated with at least one other coding mode. Encoding module 20 makes a determination regarding the coding mode currently being analyzed using information associated with at least one other coding mode that has a different block partition than the coding mode currently being analyzed. In one aspect, control module 32 uses information associated with a coding mode that has block partitions that are sub-partitions of the block partitions of the coding mode currently being analyzed. For exemplary purposes, the flow diagram of FIG. 4 will be described using the inter 16×16 coding mode as the coding mode currently being analyzed and the inter 8×8 coding mode as the first other coding mode. The techniques may, however, be used to perform coding mode selection using other types of coding modes.

Encoding module 20 obtains information associated with the coding mode currently being considered for selection and information associated with the first other coding mode (60). This information may include a number of motion vectors, reference frame indices, or the like. Encoding module 20 may compute the information associated with the coding mode currently being considered for selection and/or the information associated with the first other coding mode as needed, e.g., during the analysis of the current coding mode. For example, if control module 32 determines that the block should not be coded in the mode currently being considered for selection using the information associated with the other coding mode, encoding module 20 may not need to compute information associated with the coding mode currently being considered for selection. Alternatively, encoding module 20 may retrieve the information associated with the coding mode currently being considered for selection and/or the information associated with the first other coding mode from memory 39. In this case, the information may have been pre-computed for later consideration in analysis of coding mode selection.

Control module 32 determines whether the reference information for each of the 8×8 sub-blocks references a frame that is temporally located immediately adjacent to the current frame (62). In the case of a P block, the reference frame is temporally located immediately prior to the current frame. When control module 32 determines that the reference information associated all the sub-blocks of the inter 8×8 coding mode reference a frame that is temporally located immediately adjacent to the current frame, control module 32 may analyze the directionality of the motion vectors to determine whether the motion vectors of the 8×8 sub-blocks are substantially aligned (64). Control module 32 may, for example, determine whether the motion vectors in X and Y direction are identical or within a pre-determined threshold tolerance limit. In another example, control module 32 may compare quantized versions of the motion vectors. In either case, control module 32 compares the motion vectors of the 8×8 sub-blocks with one another. Alternatively, control module 32 may compare the direction of each of the motion vectors of the 8×8 sub-blocks with the direction of the motion vector of the 16×16 block.

When the motion vectors of any of the 8×8 sub-blocks are substantially aligned, control module 32 may analyze the residual information associated with the 8×8 coding mode and the 16×16 coding mode to determine whether the 16×16 coding mode has more residual information than the 8×8 coding mode (66). When the 16×16 coding mode has more residual information, control module 32 determines that the 16×16 coding mode does not result in the highest compression efficiency. In one aspect, control module 32 may analyze residual information associated with both the luma component and the chroma component of the pixels of the block. Control module 32 may compare the CBP costs for both the luma and chroma components to determine whether the inter 16×16 coding mode has more residual information than the 8×8 coding mode. In some aspects, the 16×16 coding mode may be deemed to have more residual information than the 8×8 coding mode when either the luma or the chroma components have more residual information. In other aspects, however, the 16×16 coding mode may be deemed to have more residual information than the 8×8 coding mode only when both of the luma and chroma components have more residual information.

When the 16×16 coding mode does not have more residual information than the 8×8 coding mode, control module 32 may compare motion information associated with the inter 16×16 coding mode with motion information associated with the inter 8×8 coding mode to determine whether the motion vector(s) associated with each is substantially the same (67). For example, control module 32 may compare a magnitude of the motion vector of the inter 16×16 coding mode with a mean of the magnitudes of the four motion vectors associated with the inter 8×8 coding mode. To compare the motion vectors, control module may compute a difference between the magnitude of the motion vector of the inter 16×16 coding mode with the mean of the magnitudes of the four motion vectors associated with the inter 8×8 coding mode and determine that the motion vectors are substantially the same when the difference is less than a threshold difference. In one example, the threshold difference may be one integer pel (e.g., an integer pixel) However, other difference thresholds may be used depending on the accuracy of the motion estimation algorithm and expected noise on the input signal (e.g., for heavily compressed input signals).

When the magnitudes of the 16×16 motion vector and the mean of the four 8×8 motion vectors are not substantially the same, when the reference information associated with any of the sub-blocks of the inter 8×8 coding mode references a frame that is not temporally located immediately adjacent to the current frame, or when the motion vectors of any of the 8×8 sub-blocks are not substantially aligned, control module 32 determines that the inter 16×16 coding mode will not result in the highest compression efficiency (68). In other words, control module 32 determines to not code the block of pixels in the inter 16×16 coding mode. When this determination is made prior to computing the information associated with the inter 16×16 coding mode, the techniques may reduce the number of computationally expensive computations that need to be performed to generate the information associated with the inter 16×16 coding mode.

When all of the conditions described above have been met, control module 32 determines whether to analyze information associated with more coding modes (70). Control module 32 may use information associated with more other coding modes to increase the accuracy of the determination. For example, control module 32 may use information associated with the inter 4×4 coding mode or other inter coding mode in addition to the information associated with the 8×8 coding mode to analyze the 16×16 inter coding mode. In some cases, it may be advantageous if the other coding modes are coding modes that use sub-blocks of the coding mode currently being analyzed. However, any coding mode with different partitions of the block of pixels may be useful in making the determination regarding the coding mode currently being analyzed.

When control module 32 determines that information associated with other coding modes should be analyzed, control module 32 uses information of the other coding modes in the same fashion as described above with respect to the information associated with the 8×8 coding mode (72). When control module 32 determines not to analyze information associated with additional other coding modes, control module 32 selects the coding mode currently being considered for the block of pixels or classifies the current coding mode as one of the remaining potential coding modes (74). Control module 32 may perform this operation for a number of other coding modes to generate a reduced set of remaining potential coding modes. In other words, control module 32 may determine which coding modes will not be selected based on this analysis and then perform further coding mode selection techniques to select from the reduced set of coding modes.

Figure 5:
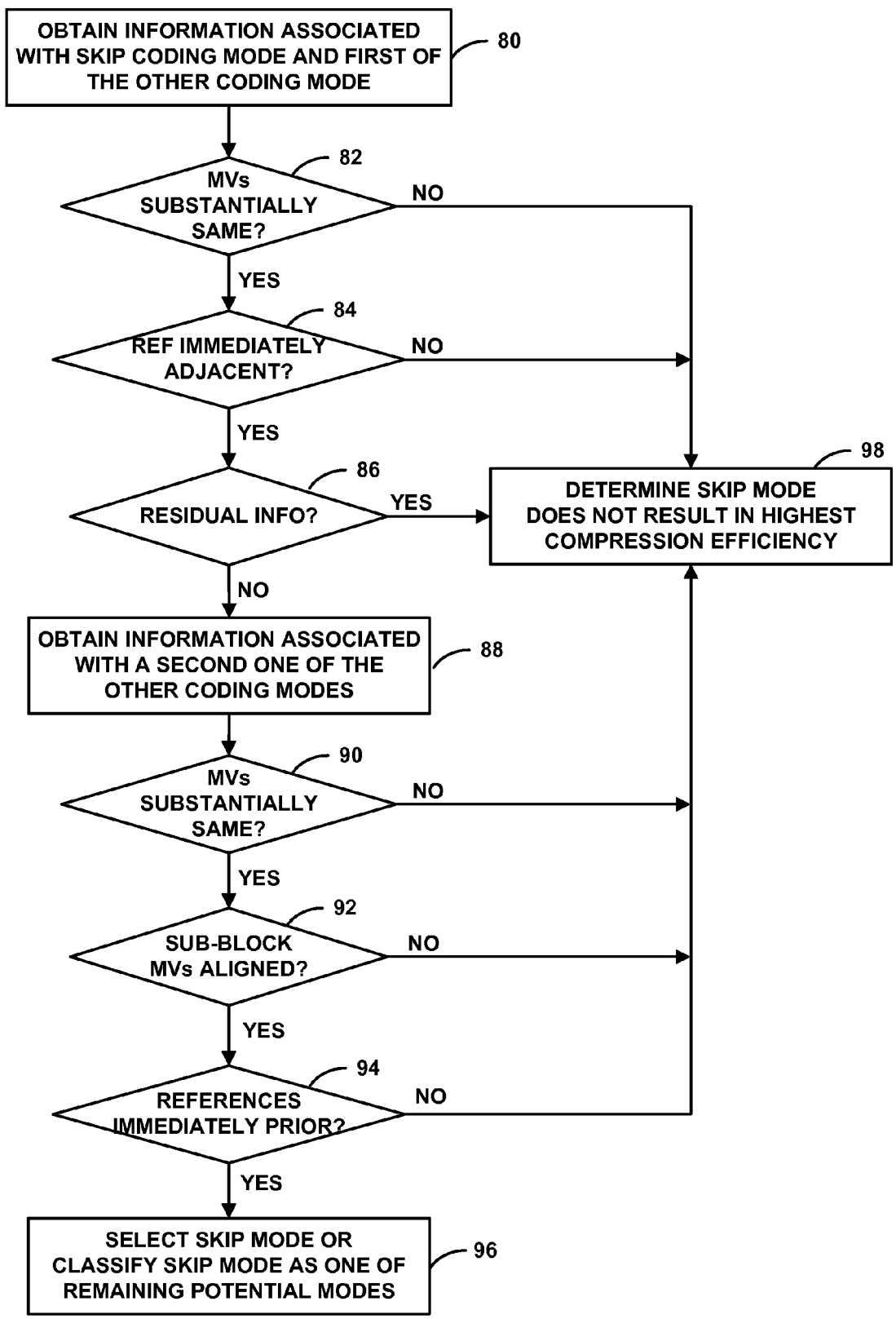
FIG. 5 is a flow diagram illustrating exemplary operation of an encoding module performing SKIP mode detection in accordance with the techniques of this disclosure.

FIG. 5 is a flow diagram illustrating exemplary operation of an encoding module, such as encoding module 20 of FIGS. 1 and 2, performing SKIP mode detection in accordance with the techniques of this disclosure. Control module 32 obtains information associated with the SKIP coding mode and information associated with the first other coding mode with the same block partitioning (80). Encoding module 20 may compute the information associated with the coding mode currently being analyzed and/or the information associated with the first other coding mode as needed, e.g., during the analysis of the current coding mode. Alternatively, encoding module 20 may retrieve the information associated with the coding mode currently being analyzed and/or the information associated with the first other coding mode from memory 39. As described above, the SKIP mode has a block partition size of 16×16, which is the same as the block partition size of the inter 16×16 coding mode. Thus, control module 32 obtains information associated with the SKIP coding mode and one other coding mode that has the same block partition as the SKIP mode.

To make the initial determination regarding the SKIP mode, control module 32 compares the motion vector of the SKIP mode with the motion vector of the inter 16×16 coding mode to determine whether the SKIP motion vector and the 16×16 motion vector are substantially the same (82). The motion vector of the SKIP mode may, for example, be predicted based on motion vectors of surrounding blocks within the same frame or in one or more reference frames. Control module 32 may compare a magnitude and/or direction of the motion vector associated with the SKIP mode with a magnitude and/or direction of the motion vector associated with the inter 16×16 coding mode.

When the motion vector associated with the SKIP mode is substantially the same as the motion vector associated with the inter 16×16 coding mode, control module 32 analyzes reference information (e.g., a reference frame index) associated with the inter 16×16 coding to determine whether the reference information references a frame that is temporally located immediately adjacent to the current frame (84).

When the reference information references a frame that is temporally located immediately adjacent to the current frame, control module 32 analyzes residual information to determine whether there is any residual information associated with the inter 16×16 coding mode (86). In one aspect, control module 32 may analyze residual information associated with both the luma component and the chroma component of the pixels of the block. Control module 32 may, for example, compute CBP costs for both the luma and chroma components to determine whether there is any residual information associated with the inter 16×16 coding mode. The CBP cost (or value) for luma and chroma may be computed using transform, quantize, and post quantization thresholding. If there is no residual information, e.g., the CBP costs of both the luma and chroma components are zero, control module 32 initially determines that SKIP coding mode is a possible coding mode.

If one of the conditions above is not met, i.e., if there is residual information, the reference information references a frame that is not temporally located immediately adjacent to the current frame, or the motion vectors of the inter 16×16 coding mode are not substantially similar, control module 32 determines that the SKIP mode is not the most efficient mode. In this manner, control module 32 may use information associated with the other coding mode that has the same block partition as the SKIP mode, i.e., the inter 16×16 coding mode, to make an initial determination regarding the SKIP mode.

Control module 32 may obtain information associated with a second one of the other coding modes to use in determining the accuracy of the initial determination (88). The second of the other coding modes has a different block partition than the SKIP mode. For exemplary purposes, the second of the other coding modes will be the inter 8×8 coding mode. However, the techniques may be used with any other coding mode that has a different block partition.

Control module 32 analyzes the information associated with the inter 8×8 coding mode in the same manner as described above with respect to FIG. 4. In particular, control module 32 compares motion information associated with the SKIP coding mode with motion information associated with the inter 8×8 coding mode to determine whether the motion information associated with each is substantially the same (90). Control module 32 also analyzes the directionality of the motion vectors to determine whether the motion vectors of the 8×8 sub-blocks are aligned (92). Additionally, control module 32 may determine whether the reference information for each of the 8×8 sub-blocks references a frame that is temporally located immediately adjacent to the current frame (94). When all of the conditions described above have been met, control module 32 selects the SKIP coding mode or classifies the SKIP coding mode as one of the remaining potential coding modes (96).

When the reference information associated with any of the sub-blocks of the inter 8×8 coding mode references a frame that is not temporally located immediately adjacent to the current frame, when the motion vectors of any of the 8×8 sub-blocks are not substantially aligned, or when the motion vectors are not substantially the same, control module 32 determines that the inter 16×16 coding mode will not result in the highest compression efficiency (98). In this manner, control module 32 uses the information associated with the 8×8 coding mode or other inter coding mode to serve as an accuracy check to evaluate if the finer modes (e.g. inter 8×8 mode) would be selected. This may, for example, be the case when the block was at the edge of two objects (e.g., motion vectors are not aligned or average motion vectors not substantially the same as inter 16×16 motion vector). Although the inter 8×8 coding mode is used for accuracy check in this example, other coding modes and/or metrics may be used to perform the accuracy check. For example, information associated with causal and non-causal (in raster scan order) macroblocks from current and reference frames. As another example, if a majority of neighboring blocks (e.g., in a 5×5 region) in the current frame are classified as SKIP blocks, control module 32 may be weighted/biased toward selecting the SKIP mode.

Based on the teachings described herein, it should be apparent that an aspect disclosed herein may be implemented independently of any other aspects and that two or more of these aspects may be combined in various ways. Such techniques may be implemented in any of a variety of devices such as general purposes computers, wireless communication device handsets, or integrated circuit devices having multiple uses including application in wireless communication device handsets and other devices. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored. The instructions or code associated with the computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

A number of aspects and examples have been described. However, various modifications to these examples are possible, and the principles presented herein may be applied to other aspects as well. These and other aspects are within the scope of the following claims.

What is claimed is:

1. A method for processing video data, the method comprising:
   obtaining information associated with a first coding mode for a first partition of a block of pixels of a current frame;
   obtaining information associated with at least one other coding mode for at least one other partition of the block of pixels, wherein the at least one other partition is different than the first partition; and
   determining whether the block of pixels should be coded in the first coding mode using at least the information associated with the at least one other coding mode,
   wherein the information associated with the at least one other coding mode is information that would be produced if the block of pixels were coded using the at least one other coding mode.

2. The method of claim 1, wherein the at least one other partition comprises sub-partitions of the first partition.

3. The method of claim 1, wherein determining whether the block of pixels should be coded in the first coding mode comprises:
   comparing motion information associated with the first coding mode with motion information associated with the at least one other coding mode; and
   determining that the block of pixels should not be coded in the first coding mode when the motion information associated with the first coding mode is not substantially similar to the motion information of the at least one other coding mode.

4. The method of claim 3, wherein comparing the motion information associated with the first coding mode with motion information associated with the at least one other coding mode comprises comparing one of a motion vector and a mean of a plurality of motion vectors associated with the first coding mode with one of a motion vector and a mean of a plurality of motion vectors associated with the at least one other coding mode.

5. The method of claim 3, wherein determining that the block of pixels should not be coded in the first coding mode when the motion information associated with the first coding mode is not substantially similar to the motion information of the at least one other coding mode comprises determining that the block of pixels should not be coded in the first coding mode when a difference between the motion information associated with the first coding mode and the motion information of the at least one other coding mode is greater than or equal to a threshold.

6. The method of claim 1, wherein determining whether the block of pixels should be coded in the first coding mode comprises:
   comparing a direction of each of a plurality of motion vectors associated with the at least one other coding mode; and
   determining that the block of pixels should not be coded in the first coding mode when one or more of the plurality of motion vectors associated with the at least one other coding mode is aligned in a different direction.

7. The method of claim 1, wherein determining whether the block of pixels should be coded in the first coding mode comprises:
  analyzing reference information associated with the at least one other coding mode; and
  determining that the block of pixels should not be coded in the first coding mode when the reference information references to a frame that is not temporally located immediately adjacent to the current frame.

8. The method of claim 1, wherein determining whether the block of pixels should be coded in the first coding mode comprises:
  comparing a first amount of luma and chroma residual information associated with the first coding mode with a second amount of luma and chroma residual information associated with the at least one other coding mode; and
  determining that the block of pixels should not be coded in the first coding mode when the first amount of luma and chroma residual information is larger than the second amount of luma and chroma residual information.

9. The method of claim 1, wherein:
  obtaining information associated with the at least one other coding mode for the at least one other partition of the block of pixels comprises obtaining information associated with two other coding modes for two other partitions of the block of pixels, wherein one partition of the two other partitions is different than the first partition and another partition of the two other partitions is the same as the first partition, and determining whether the block of pixels should be coded in the first coding mode comprises determining whether the block of pixels should be coded in the first coding mode using the information associated with the first and second other coding modes.

10. The method of claim 9, wherein determining whether the block of pixels should be coded in the first coding mode comprises determining whether the block of pixels should be coded in the first coding mode based on at least luma residual information and chroma residual information associated with the one of the two other coding modes that has the partition that is the same as the first partition.

11. The method of claim 9, wherein the first coding code comprises one of a SKIP coding mode and a DIRECT coding mode.

12. The method of claim 1, wherein determining whether the block of pixels should be coded in the first coding mode comprises selecting the first coding mode based at least on the information associated with the at least one other coding mode and further comprising coding the block of pixels in the first coding mode.

13. An apparatus for processing video data, the apparatus comprising:
  a memory; and
  a control module that obtains, from the memory, information associated with a first coding mode for a first partition of a block of pixels of a current frame and information associated with at least one other coding mode for at least one other partition of the block of pixels, and determines whether the block of pixels should be coded in the first coding mode using at least the information associated with the at least one other coding mode, wherein the at least one other partition is different than the first partition, wherein the information associated with the at least one other coding mode is information that would be produced if the block of pixels were coded using the at least one other coding mode.

14. The apparatus of claim 13, wherein the at least one other partition comprises sub-partitions of the first partition.

15. The apparatus of claim 13, wherein the control module compares motion information associated with the first coding mode with motion information associated with the at least one other coding mode and determines that the block of pixels should not be coded in the first coding mode when the motion information associated with the first coding mode is not substantially similar to the motion information of the at least one other coding mode.

16. The apparatus of claim 15, wherein the control module compares one of a motion vector and a mean of a plurality of motion vectors associated with the first coding mode with one of a motion vector and a mean of a plurality of motion vectors associated with the at least one other coding mode.

17. The apparatus of claim 15, wherein the control module determines that the block of pixels should not be coded in the first coding mode when a difference between the motion information associated with the first coding mode and the motion information of the at least one other coding mode is greater than or equal to a threshold.

18. The apparatus of claim 13, wherein the control module compares a direction of each of a plurality of motion vectors associated with the at least one other coding mode and determines that the block of pixels should not be coded in the first coding mode when one or more of the plurality of motion vectors associated with the at least one other coding mode is aligned in a different direction.

19. The apparatus of claim 13, wherein the control module analyzes reference information associated with the at least one other coding mode and determines that the block of pixels should not be coded in the first coding mode when the reference information references to a frame that is not temporally located immediately adjacent to the current frame.

20. The apparatus of claim 13, wherein the control module compares a first amount of luma and chroma residual information associated with the first coding mode with a second amount of luma and chroma residual information associated with the at least one other coding mode and determines that the block of pixels should not be coded in the first coding mode when the first amount of luma and chroma residual information is larger than the second amount of luma and chroma residual information.

21. The apparatus of claim 13, wherein the control module obtains information associated with two other coding modes for two other partitions of the block of pixels and determines whether the block of pixels should be coded in the first coding mode using the information associated with the first and second other coding modes, wherein one partition of the two other partitions is different than the first partition and another partition of the two other partitions is the same as the first partition.

22. The apparatus of claim 21, wherein the control module determines whether the block of pixels should be coded in the first coding mode based on at least luma residual information and chroma residual information associated with the one of the two other coding modes that has the partition that is the same as the first partition.

23. The apparatus of claim 21, wherein the control module determines whether the block of pixels should be coded in one of a SKIP coding mode and a DIRECT coding mode.

24. The apparatus of claim 13, wherein the control module selects the first coding mode based at least on the information associated with the at least one other coding mode and further comprising and further comprising an encoder for encoding the block of pixels in the first coding mode.

25. An apparatus for processing video data, the apparatus comprising:
- means for obtaining information associated with a first coding mode for a first partition of a block of pixels of a current frame;
- means for obtaining information associated with at least one other coding mode for at least one other partition of the block of pixels, wherein the at least one other partition is different than the first partition mode; and
- means for determining whether the block of pixels should be coded in the first coding mode using at least the information associated with the at least one other coding mode,
- wherein the information associated with the at least one other coding mode is information that would be produced if the block of pixels were coded using the at least one other coding mode.

26. The apparatus of claim 25, wherein the at least one other partition comprises sub-partitions of the first partition.

27. The apparatus of claim 25, wherein the determining means compares motion information associated with the first coding mode with motion information associated with the at least one other coding mode and determines that the block of pixels should not be coded in the first coding mode when the motion information associated with the first coding mode is not substantially similar to the motion information of the at least one other coding mode.

28. The apparatus of claim 27, wherein the determining means compares one of a motion vector and a mean of a plurality of motion vectors associated with the first coding mode with one of a motion vector and a mean of a plurality of motion vectors associated with the at least one other coding mode.

29. The apparatus of claim 27, wherein the determining means determines that the block of pixels should not be coded in the first coding mode when a difference between the motion information associated with the first coding mode and the motion information of the at least one other coding mode is greater than or equal to a threshold.

30. The apparatus of claim 25, wherein the determining means compares a direction of each of a plurality of motion vectors associated with the at least one other coding mode and determines that the block of pixels should not be coded in the first coding mode when one or more of the plurality of motion vectors associated with the at least one other coding mode is aligned in a different direction.

31. The apparatus of claim 25, wherein the determining means analyzes reference information associated with the at least one other coding mode and determines that the block of pixels should not be coded in the first coding mode when the reference information references to a frame that is not temporally located immediately adjacent to the current frame.

32. The apparatus of claim 25, wherein the determining means compares a first amount of luma and chroma residual information associated with the first coding mode with a second amount of luma and chroma residual information associated with the at least one other coding mode and determines that the block of pixels should not be coded in the first coding mode when the first amount of luma and chroma residual information is larger than the second amount of luma and chroma residual information.

33. The apparatus of claim 25, wherein: the obtaining means obtains information associated with two other coding modes for two other partitions of the block of pixels, wherein one partition of the two other partitions is different than the first partition and another partition of the two other partitions is the same as the first partition, and the determining means determines whether the block of pixels should be coded in the first coding mode using the information associated with the first and second other coding modes.

34. The apparatus of claim 33, wherein the determining means determines whether the block of pixels should be coded in the first coding mode based on at least luma residual information and chroma residual information associated with the one of the two other coding modes that has the partition that is the same as the first partition.

35. The apparatus of claim 33, wherein the first coding code comprises one of a SKIP coding mode and a DIRECT coding mode.

36. The apparatus of claim 25, wherein the determining means selects the first coding mode based at least on the information associated with the at least one other coding mode and further comprising means for coding the block of pixels in the first coding mode.

37. A computer-program product for processing multimedia data comprising a non-transitory computer readable medium having instructions thereon, the instructions comprising:
- code for obtaining information associated with a first coding mode for a first partition of a block of pixels of a current frame;
- code for obtaining information associated with at least one other coding mode for at least one other partition of the block of pixels, wherein the at least one other partition is different than the first partition mode; and
- code for determining whether the block of pixels should be coded in the first coding mode using at least the information associated with the at least one other coding mode,
- wherein the information associated with the at least one other coding mode is information that would be produced if the block of pixels were coded using the at least one other coding mode.

38. The computer-program product of claim 37, wherein the at least one other partition comprises sub-partitions of the first partition.

39. The computer-program product of claim 37, wherein code for determining whether the block of pixels should be coded in the first coding mode comprises:
- code for comparing motion information associated with the first coding mode with motion information associated with the at least one other coding mode; and
- code for determining that the block of pixels should not be coded in the first coding mode when the motion information associated with the first coding mode is not substantially similar to the motion information of the at least one other coding mode.

40. The computer-program product of claim 39, wherein code for comparing the motion information associated with the first coding mode with motion information associated with the at least one other coding mode comprises code for comparing one of a motion vector and a mean of a plurality of motion vectors associated with the first coding mode with one of a motion vector and a mean of a plurality of motion vectors associated with the at least one other coding mode.

41. The computer-program product of claim 39, wherein code for determining that the block of pixels should not be coded in the first coding mode when the motion information associated with the first coding mode is not substantially similar to the motion information of the at least one other coding mode comprises code for determining that the block of pixels should not be coded in the first coding mode when a difference between the motion information associated with the first coding mode and the motion information of the at least one other coding mode is greater than or equal to a threshold.

42. The computer-program product of claim 37, wherein code for determining whether the block of pixels should be coded in the first coding mode comprises:
code for comparing a direction of each of a plurality of motion vectors associated with the at least one other coding mode; and
code for determining that the block of pixels should not be coded in the first coding mode when one or more of the plurality of motion vectors associated with the at least one other coding mode is aligned in a different direction.

43. The computer-program product of claim 37, wherein code for determining whether the block of pixels should be coded in the first coding mode comprises:
code for analyzing reference information associated with the at least one other coding mode; and
code for determining that the block of pixels should not be coded in the first coding mode when the reference information references to a frame that is not temporally located immediately adjacent to the current frame.

44. The computer-program product of claim 37, wherein code for determining whether the block of pixels should be coded in the first coding mode comprises:
code for comparing a first amount of luma and chroma residual information associated with the first coding mode with a second amount of luma and chroma residual information associated with the at least one other coding mode; and
code for determining that the block of pixels should not be coded in the first coding mode when the first amount of luma and chroma residual information is larger than the second amount of luma and chroma residual information.

45. The computer-program product of claim 37, wherein:
code for obtaining information associated with the at least one other coding mode for the at least one other partition of the block of pixels comprises code for obtaining information associated with two other coding modes for two other partitions of the block of pixels, wherein one partition of the two other partitions is different than the first partition and another partition of the two other partitions is the same as the first partition, and code for determining whether the block of pixels should be coded in the first coding mode comprises code for determining whether the block of pixels should be coded in the first coding mode using the information associated with the first and second other coding modes.

46. The computer-program product of claim 45, wherein code for determining whether the block of pixels should be coded in the first coding mode comprises code for determining whether the block of pixels should be coded in the first coding mode based on at least luma residual information and chroma residual information associated with the one of the two other coding modes that has the partition that is the same as the first partition.

47. The computer-program product of claim 45, wherein the first coding code comprises one of a SKIP coding mode and a DIRECT coding mode.

48. The computer-program product of claim 37, wherein code for determining whether the block of pixels should be coded in the first coding mode comprises code for selecting the first coding mode based at least on the information associated with the at least one other coding mode and further comprising code for coding the block of pixels in the first coding mode.

49. A wireless communication device handset for processing video data, the handset comprising:
an encoding module that obtains information associated with a first coding mode for a first partition of a block of pixels of a current frame and information associated with at least one other coding mode for at least one other partition of the block of pixels, determines whether the block of pixels should be coded in the first coding mode using at least the information associated with the at least one other coding mode and codes the block of pixels in the first coding mode, wherein the at least one other partition is different than the first partition, wherein the information associated with the at least one other coding mode is information that would be produced if the block of pixels were coded using the at least one other coding mode; and
a transmitter for transmitting the coded block of pixels.

50. The handset of claim 49, wherein the at least one other partition comprises sub-partitions of the first partition.

51. The handset of claim 49, wherein the encoding module compares motion information associated with the first coding mode with motion information associated with the at least one other coding mode and determines that the block of pixels should not be coded in the first coding mode when the motion information associated with the first coding mode is not substantially similar to the motion information of the at least one other coding mode.

52. The handset of claim 51, wherein the encoding module compares one of a motion vector and a mean of a plurality of motion vectors associated with the first coding mode with one of a motion vector and a mean of a plurality of motion vectors associated with the at least one other coding mode.

53. The handset of claim 51, wherein the encoding module determines that the block of pixels should not be coded in the first coding mode when a difference between the motion information associated with the first coding mode and the motion information of the at least one other coding mode is greater than or equal to a threshold.

54. The handset of claim 49, wherein the encoding module compares a direction of each of a plurality of motion vectors associated with the at least one other coding mode and determines that the block of pixels should not be coded in the first coding mode when one or more of the plurality of motion vectors associated with the at least one other coding mode is aligned in a different direction.

55. The handset of claim 49, wherein the encoding module analyzes reference information associated with the at least one other coding mode and determines that the block of pixels should not be coded in the first coding mode when the reference information references to a frame that is not temporally located immediately adjacent to the current frame.

56. The handset of claim 49, wherein the encoding module compares a first amount of luma and chroma residual information associated with the first coding mode with a second amount of luma and chroma residual information associated with the at least one other coding mode and determines that the block of pixels should not be coded in the first coding mode when the first amount of luma and chroma residual information is larger than the second amount of luma and chroma residual information.

57. The handset of claim 49, wherein the encoding module obtains information associated with two other coding modes for two other partitions of the block of pixels and determines whether the block of pixels should be coded in the first coding mode using the information associated with the first and second other coding modes, wherein one partition of the two other partitions is different than the first partition and another partition of the two other partitions is the same as the first partition.

58. The handset of claim 57, wherein the encoding module determines whether the block of pixels should be coded in the first coding mode based on at least luma residual information and chroma residual information associated with the one of the two other coding modes that has the partition that is the same as the first partition.

59. The handset of claim 57, wherein the encoding module determines whether the block of pixels should be coded in one of a SKIP coding mode and a DIRECT coding mode.

60. The handset of claim 49, wherein the encoding module selects the first coding mode based at least on the information associated with the at least one other coding mode and further comprising and further comprising an encoder for encoding the block of pixels in the first coding mode.

\* \* \* \* \*